July 21, 1964 L. LACHMAN ETAL 3,141,792

AUTOMATIC TABLET COATING APPARATUS

Filed June 8, 1962 3 Sheets-Sheet 1

INVENTORS
LEON LACHMANN
SEYMOUR WEINSTEIN
BY
ATTORNEYS

INVENTORS
LEON LACHMANN
SEYMOUR WEINSTEIN
BY
Henry [signature]
ATTORNEYS

AUTOMATIC TABLET COATING APPARATUS

Filed June 8, 1962 3 Sheets-Sheet 3

INVENTORS
Leon Lachmann
Seymour Weinstein
BY
ATTORNEYS

United States Patent Office 3,141,792
Patented July 21, 1964

3,141,792

AUTOMATIC TABLET COATING APPARATUS

Leon Lachman, Summit, and Seymour Weinstein, Orange, N.J., assignors to Ciba Corporation, New York, N.Y., a corporation of Delaware Filed June 8, 1962, Ser. No. 203,685
4 Claims. (Cl. 118—6)

Figures 1, 2, 7:
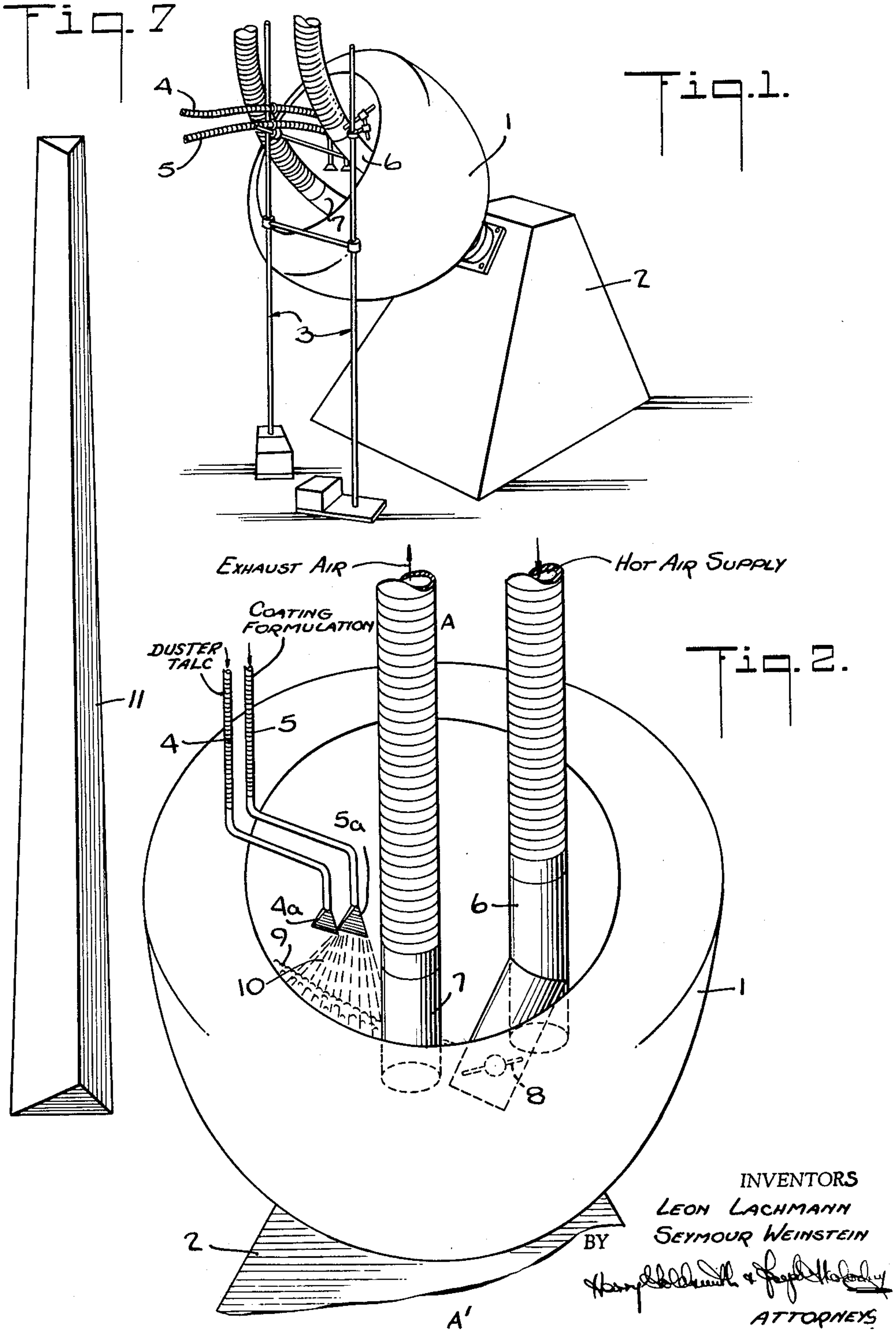

This invention relates to and has for its object the provision of an apparatus useful for the automatic application of uniform coatings. The invention is particularly aplicable for the film coating (particularly enteric coating) of medicinal tablets or capsules, which coatings are obtainable automatically with more uniform physical and disintegrating properties than can be obtained by the manual coating procedures of the prior art. The invention is also applicable for the coating of particles, for example, granules, such as those of U.S. Patent No. 2,738,-303, issued March 13, 1956.

In film coating of medicinal tablets (or capsules or particles), the weight of the coating on the tablet (or capsule or particle) is normally no more than about 10% of the weight of the uncoated tablet. Thus, a tablet weighing about 5 grams would have a maximum weight of about 0.5 gram, which coating would have to be provided to completely cover the surface of the tablet. Where correspondingly smaller tablets are involved, smaller surface coatings are, of course, necessary. It is thus evident that there is practically no margin for error in the coating process. It is also evident that the provision of an extremely uniform coating is advantageous in that one may minimize the amount of coating material used and one may better control the solution of the coating and the release of active material from the core.

When coatings are applied by the manual coating process, especially where such process is concerned with the enteric coating of medicinal tablets, capsules or particles, several coats must be applied rapidly (a coating approximately every three minutes). In the three-minute period for application of each coat, it is necessary to add the coating formulation, hereinafter identified as coating solution or suspension, then dust with talc or other chemically inert powder and finally dry by the application of hot, forced air. The coating solution or suspension and/or the chemically inert dusting powder may, if desired, contain active ingredients. Obviously, in manual operation, the reproducibility of the time for the various operations within the overall three-minute period for each coat will vary from operator to operator and, with the same operator, from one period to another. In manual operation, it is extremely important that the amount of talc used be properly controlled since the uniformity of its distribution during the coating operation has an important bearing on the disintegration, etc., of a coated tablet [see Wagner and Long, F.A.Ph.A., Sci. Ed., 49, 3, pp. 121–127 (1960)]. It is also evident that, if the volume of the coating solution or suspension added during the coating cycle were inadequate to wet all tablets, the subsequent talc pick-up during the dusting phase would be non-uniform.

It has now been found that, by means of the apparatus of the invention, one may eliminate human variables and guarantee the provision of uniform reproducible film coatings on tablets, capsules or particles.

According to the invention, a punched and/or magnetic tape, traveling a fixed distance per unit of time, is used to transmit signals through a tape transmitter to the necessary relays to activate the several elements of each coating cycle. This transmission system, hereinafter referred to as "the programmer," may be in the form of a Western Union Tape Transmitter 34–A, which is designed for five-unit code transmission using chadless perforated tape about $^{11}/_{16}''$ wide with in-line feed holes or a corresponding magnetic tape transmitter. For the perforated tape, the code pins are located on the left side of the tape transmitter, and the tape is pulled forward over the pins by the feed wheel; the magnetic tape is transmitted electronically. (The above description, as well as the description below, will be evident also from accompanying drawing, FIGURE 6.) The cycle controlled by the five-unit code or magnetic transmitter involves (1) Application of a suspension of a coating solution (such as a cellulose acetate phthalate coating solution) to the tablets, capsules or particles in the coating pan, normally as a fine spray.

(2) Allowing a prescibed time interval for complete distribution of coating formulation before spraying talc.

(3) Spraying a quantity of dusting powder (e.g. talc or other powder) on to the tablets, capsules or particles.

(4) Application of heated forced air to dry the coating.

(The series of steps 1–4 is repeated until the desired number of coatings is applied as indicated on the tape.)

(5) Stopping the spray cycle.

The 5-step procedure may be simplified to utilize a cycle which involves (1) Application of a suspension of dusting powder (e.g. talc or other powder) in the coating solution (such as a cellulose acetate phthalate coating solution) to the tablets, capsules or particles in the coating pan, normally as a fine spray.

(2) Allowing a prescribed time interval for complete distribution of coating formulation.

(3) Application of heated forced air to dry the coat.

(The series of steps 1–3 is repeated until the desired number of coatings is applied as indicated on the tape.)

(4) Stopping the spray cycle.

Normally, the amount of coating material which is added is about 5 to about 15% by weight over that necessary to supply one coating to the entire batch of tablets, capsules or particles in the coating pan. Where a number of coats are to be applied, however, it may be advantageous to increase the number of applications of coating material and to utilize, for each application, only a fraction of the amount of coating material (about 0.2 to about 10.0%, preferably about 0.2 to about 1.5%) of the amount necessary to supply one coating to the entire batch of tablets, capsules or particles and increasing, correspondingly, to the number of applications. Such procedure is advantageous in permitting the elimination of the step involving allowing a prescribed time interval for complete distribution of coating formulation before spraying the dusting powder or completely eliminating the need for a dusting powder.

The programmer transmits its signals to a series of relays which subsequently (1) start pan rotation, (2) start and stop spray guns through solenoids, (3) open and close the damper for the compressed hot air, and (4) activate a latching relay to end the cycle. Using this automated system of coating makes very simple any changes desired in the coating cycle. Thus, for changes in the cycle time, it is only necessary to insert, into the tape transmitter, a different punched or magnetic tape. Thus, it is evident that a programming system of this type can be used for many, varied tablet, capsule or particle formulations, even though different coating cycles may be necessary. By having available a punched or magnetic tape for each tablet, capsule or particle to be coated, any desired time cycle can be obtained using this programming arrangement. Standard paper or Mylar tapes may be used as punched tapes, and, once the desired cycle is punched out, these tapes may be used and reused. Obviously, the time of each operation in the cycle may be varied in the manner of the prior art. Thus, the coating formulation spray time may be varied depending on the viscosity of the material, the thickness of the desired coating and the number of coats desired. Similarly, the dusting powder spray, such as talc spray, and hot air drying time may be varied depending upon the situation in each particular case. Normally, the time utilized for applying the coating spray solution or suspension is about 3 seconds to about 3 minutes, dusting powder about 10 seconds to about 1 minute and air drying about 3 seconds to about 3 minutes; the time interval between sprays and drying is about 10 seconds to about 1 minute. However, where dusting is eliminated as a separate step, no time interval is necessary. Characteristic times for these operations are: spray solution or suspension 30 seconds, dusting 20 seconds and air drying 120 seconds. More specifically, in order to coat $^{14}\!/_{32}$″ diameter modified ball tablets, one may utilize the following cycle using a 10% cellulose acetate phthalate coating suspension containing, per 100 liters, cellulose acetate phthalate, 10.0 kg.; ethyl lactate 12.0 l.; acetone 20.0 l.; 3A alcohol q.s. 100 l. The spray is regulated to deliver 1200 ml./minute coating suspension in the following coating cycle:

| Coat Number | 10% Talc Susp. Spray | Interval Between Sprays | Talc Spray | Drying Time |
|---|---|---|---|---|
| 1 | 2′15″ | 30″ | 20″ | 2′ |
| 2–9 | 30″ | 30″ | 20″ | 2′ |
| 10 | 30″ | 30″ | 20″ | 3′ |
| 11–19 | 30″ | 30″ | 20″ | 2′ |
| 20 | 30″ | 30″ | 20″ | 3′ |
| 21–24 | 30″ | 30″ | 15″ | 2′ |
| 25 | 30″ | 30″ | 15″ | 3′ |
| 26–29 | 30″ | 30″ | 15″ | 2′ |
| 30 | 30″ | 30″ | 15″ | 5′ |

Figures 3, 4, 5:
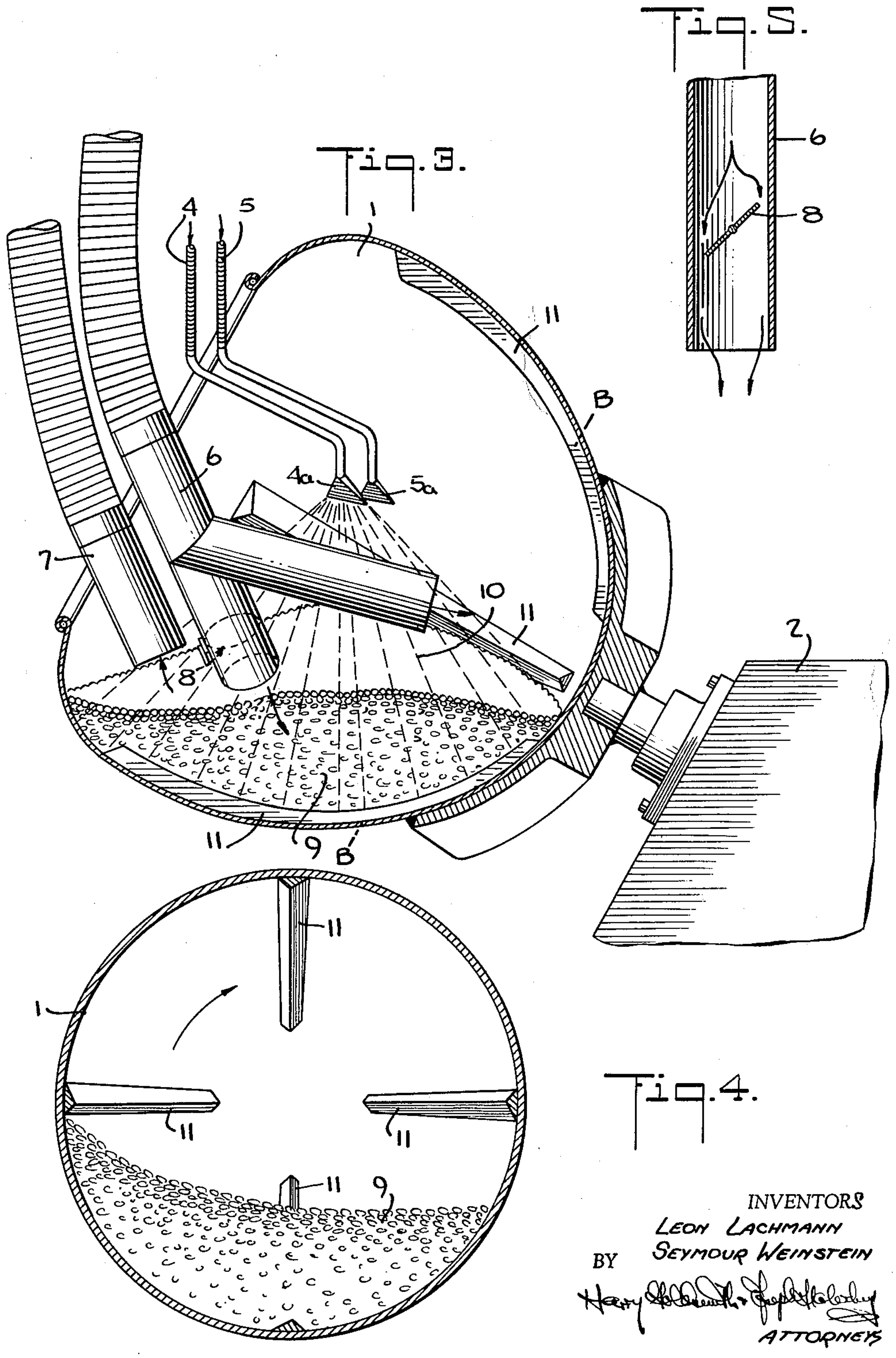

Certain equipment is needed to carry out the automated coating cycle, programmed in the manner indicated above. Thus, the apparatus includes tanks to store the coating solution or suspension and dusting powder. Any convenient holding tank may be used for this purpose. For example, it has been found expedient to utilize a DeVilbiss Pressure Feed Tank Model PQMR–510 or a Nordson Hot Airless Spray Unit Model APHP for pressurizing the coating materials and, where a duster is used, it has been found expedient to utilize a modified Ansul Dry Powder Fire Extinguisher Tank. For spraying these materials, one may use a Spraying System 1/4 JAUH Automatic Hydraulic Gun-Nozzle TT 11002, a Nordson Automatic Spray Gun AG–100–B–Nozzle 20C–13 or any other equivalent spraying means. Spray pressures normally vary from 100 to 2000 p.s.i. In addition, means are included for providing a hot air supply and a conduit for removing exhaust air. Of course, it is also necessary to have a coating pan for carrying out the coating operation. The coating pan used may be any one of the standard types, modified by insertion of, preferably, 3 to 4 baffles in order to insure adequate tumbling of the tablets, capsules or particles during the coating operation. Thus, the coating pan may, inter alia, be a pear shaped coating pan (e.g. Groen Pear Coating Pan, Stainless Steel, Dwg. C–58205), an angular shaped coating pan (e.g. Groen Angular Coating Pan, Stainless Steel, Dwg. C–5669), a doughnut shaped coating pan (e.g. Colton Doughnut Coating Pan, No. 46), a hexagonal shaped coating pan (e.g. Colton Hexagonal Coating Pan, Modified No. 16), etc. The baffles attached to the interior of the coating pan are preferably placed about 5 or 6 inches to about 10 inches from the bottom center of the pan located substantially at the position of the motor housing shaft and then extend from about 5 to about 9 to 10 inches from its periphery and are normally sloped in the direction of the motion of the coating pan. The number of baffles used may be varied. Normally 3 to 4 equidistant baffles are adequate. However, the number may be increased or decreased if desired. The baffles may be tapered toward the center of the pan and may be designed with a gradual rise from the bottom to the periphery of the pan. Angular or curved baffles may also be used and any non-reactive materials may be employed to make the baffles. Thus, one may use hardwood or maple; or one may use steel (preferably stainless steel), copper, polyethylene, polypropylene (or other such polyolefins), Teflon, solvent resistant rubber (e.g. purified butyl rubber), etc. A typical baffle identified by the numeral 11 in FIGURE 3 is shown in detail as FIGURE 7 for a pear shaped coating pan. For a 42″ pear shaped coating pan a typical baffle would have an extended length of about 33″ to fit the curvature of the pan. Such baffle may be made of type 316 stainless steel and it is preferably sloped in the direction of the pan's rotation. The slope gradually increases from about 1″ at the center or base of the pan to about 2½″ at the periphery or open end of the pan. The baffle height is also preferably made to show a gradual rise from about $^{9}\!/_{16}$″ at the center or base of the pan to about 1¼″ at the periphery or open end of the pan. In addition, the width of the baffle is preferably gradually increased from about 1⅝″ at the base of the pan to about 3½″ at the periphery or open end of the pan.

Figure 6:
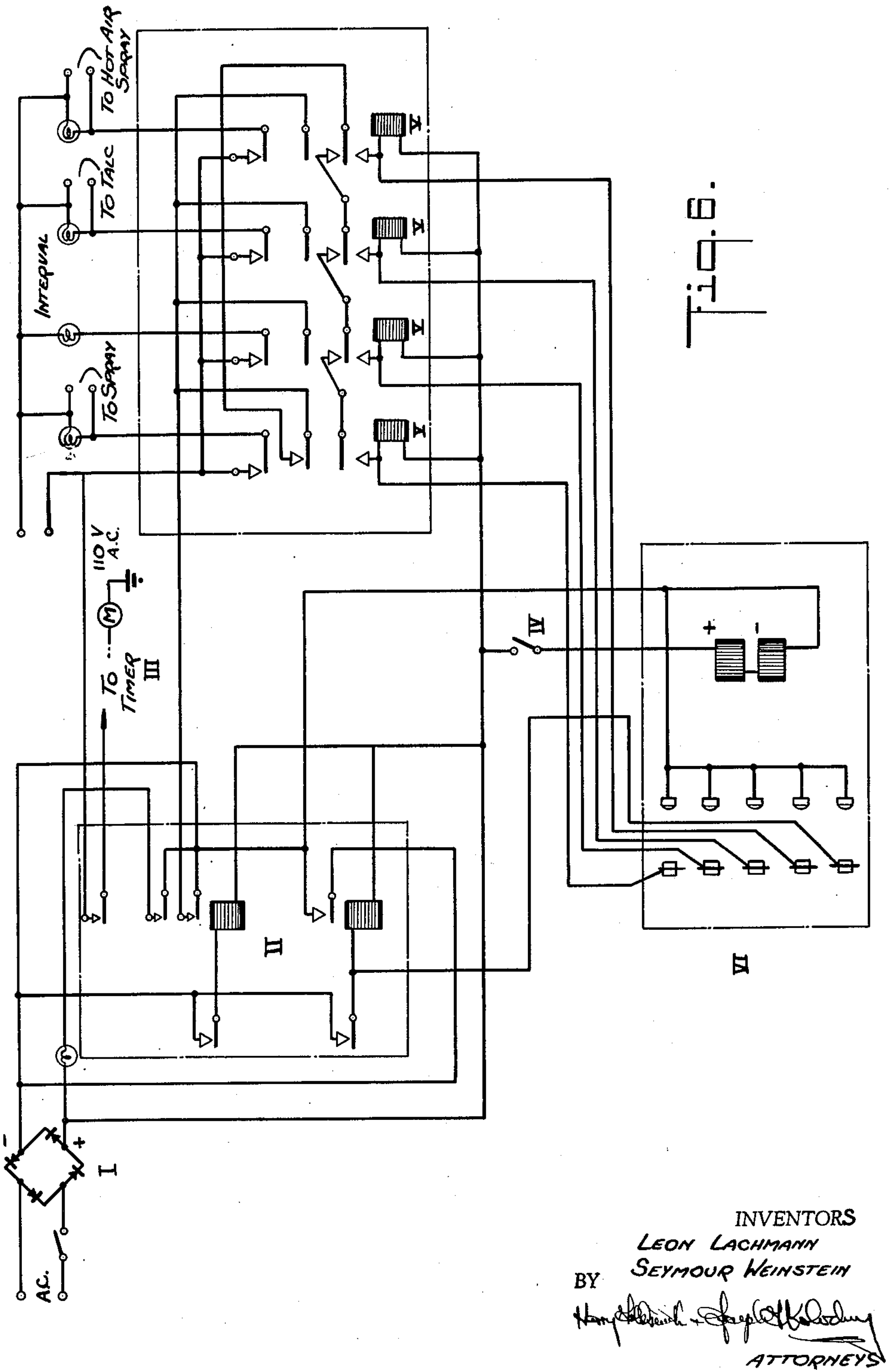

In the accompanying drawings, FIGURE 1 is a right oblique view showing the coating pan and means for carrying out the coating operation, FIGURE 2 is a front elevation of the coating pan and means for carrying out the coating operation, FIGURE 3 is a vertical cross section through the center of the coating pan on the axis A, A′ and means for carrying out the coating operation, FIGURE 4 is a cross section view of the coating pan on the axis B, B′ with baffles sloped in the direction of the motion of the coating pan as indicated by the arrow, FIGURE 5 shows the damper for distributing the hot air supply in the pan and FIGURE 6 shows the wiring diagram of the programmer. FIGURE 7 shows the type baffle used in the coating pan with tapering dimensional aspects.

More specifically with respect to the drawings, FIGURE 1 shows the coating pan 1 mounted on a coating pan motor housing 2 containing standard means for rotation. Clamping means 3 hold the tubular means for duster spray 4, normally talc, and coating solution spray 5. Hot air enters through a standard supply duct 6 and exhaust air escapes through exhaust air duct 7. FIGURE 2, showing a front elevation of the coating apparatus, shows the coating pan 1 mounted on a coating pan motor housing 2, tubular means for duster spray 4 with spray nozzle terminus *4a* and coating solution 5 with spray nozzle terminus *5a*, hot air supply duct 6 and exhaust air duct 7, as well as damper 8 to control the hot air flow distribution into pan. The hot air supply duct 6 is also shown in detail in FIGURE 5, wherein the adjustable damper 8 is shown for regulating the distribution of hot air entering the coating pan. FIGURE 3, showing a vertical cross section of the apparatus, through the center of the pan on the axis A, A′ of FIGURE 2, showing the same details as the latter figure in the features designated by numerals 1 through 8, but showing, additionally, the presence of the tablets, capsules or particles to be coated 9, spray material 10 and gradually tapered baffles 11 equidistant from one another and sloped in the direction of the pan's motion. FIGURE 4 shows a vertical cross section of the coating pan 1 through the center of the pan on the axis B, B′ of FIGURE 3, including the tablets, capsules or particles to be coated and four gradually tapered baffles 11 equidistant from one another and sloped in the direction of the pan's rotation. FIGURE 6 describes the wiring system of the programmer, including a full wave selenium rectifier D.C. (I), a latching relay (II), a clock timer and motor (III), a micro switch for said timer (IV) and relay (V) all operated by means of a transmitter (VI), Western Union Model 34A.

The invention involves means for (1) programming a cycle for tablet (or capsule or particle) coating on a punched tape or equivalent means, such as magnetic tape, (2) transmitting code signals on punched tape or equivalent means, such as magnetic tape through a programmer (1) activating means for rotation of a coating pan containing uncoated tablets (or capsules or particles) and having 3 to 4 baffles, then (2) activating means for spraying coating solution or suspension onto said uncoated tablets (or capsules or particles), then after spraying is complete and tablets, capsules or particles are coated, (3) activating means for spraying dusting powder (e.g. talc or other powder) onto said coated tablets, capsules or particles to prevent attrition of the coating then (4) activating means for adding heated compressed air to dry said dusted coated tablets, capsules or particles, repeating said cycle (1) through (4) until adequate coating thickness is obtained. If desired, one may omit the addition of duster means and perform the drying by means of compressed air immediately following application of the coating solution.

The materials used in the apparatus of the invention are the same as those used in prior art procedures. Thus, the film coating material may be cellulose acetate phthalate or other similar esters (as is described in U.S. Patent No. 2,196,768); methyl, ethyl, propyl, i-propyl, n-butyl, i-butyl, tert. butyl cellulose ethers (or the corresponding hydroxy-lower alkyl cellulose ethers), having about 2–2.5 alkoxy groups per anhydroglucose unit; copolymers of ethylene with maleic anhydride and partial hydrolysis products of these polymers (as are described in U.S. Patent No. 2,954,323); polyvinyl alcohol; polyethylene oxide resins having an average molecular weight of about 50,000 to about 100,000; polyethylene glycols and their higher fatty acid esters, these polymers having an average molecular weight of about 4,000 to about 20,000; N-vinyl-5-methyl-2-oxazolidinone copolymers (e.g. Devlex 130, A515); partially hydrolyzed starch (e.g. Flogel). Standard solvents used for these film coating materials include ethanol; isopropanol; acetone; ethyl acetate; 1,1,1-trichlorethane; methylene chloride; dioxane; methyl ethyl ketone; isobutyl acetate; water; etc. Representative plasticizers for the film coating materials include dimethyl and diethyl phthalate; ethyl lactate; triacetin; triethyl citrate; butyl stearate; glycerin; castor oil; polyvinyl alcohol; benzyl benzoate; polyoxyethylene sorbitan esters with higher fatty acids (e.g. stearate, laurate), sorbitan higher fatty acid esters (e.g. stearate, laurate). The amounts of these materials obviously vary to meet the needs in each particular situation. Thus, a standard coating solution may contain (all percentages are by weight):

| | Percent |
|---|---|
| Cellulose acetate phthalate | 10 |
| Diethyl phthalate | 2.5 |
| Acetone | 20 |
| 3A anhydrous alcohol, q.s | 100 |

The relationship between plasticizer and talc concentrations is also standard. Following are characteristic ratios of plasticizer to talc concentrations (all percentages are by weight).

| Plasticizer concentration: | Talc concentration, percent |
|---|---|
| Triacetin, 10% | 30 |
| Ethyl lactate, 10% | 20 |
| Diethyl phthalate, 10% | 20 |
| Diethyl phthalate, 5% | 15 |
| Diethyl phthalate, 2.5% | 10 |

This application is, in part, a continuation of our application Serial No. 135,472, filed September 1, 1961, and now abandoned.

This invention may be variously otherwise embodied within the scope of the appended claims.

What is claimed is:

1. An apparatus for coating materials selected from the group consisting of tablets, capsules and particles, which comprises a baffled coating pan equipped with 3 to 4 gradually tapered baffles, equidistant from each other, sloped in the direction of the motion of said coating pan and extending so that (1) the ratio of the pan diameter to the distance from the bottom end of the baffle to the bottom center of the pan and (2) the ratio of the pan diameter to the distance from the top end of the baffle to the outer edge of the pan are each from about 4.2 to about 8.4, means for rotating said coating pan, means for spraying coating formulation, means for spraying dusting powder, means for providing compressed hot air and means for hot air withdrawal, all of said means operating within said coating pan, means for reading and transmitting coded signals, covering a plurality of at least about ten cycles, on interchangeable tapes to a series of five independently activated relays, one of said relays being connected to a coating pan positioned on an inclined axis to activate means for initiating rotation of said coating pan, a second of said relays connected to a spray means to activate said means for regulating coating formulation flow, a third of said relays connected to a spray means to activate said means for regulating dusting powder suspension flow, a fourth of said relays connected to compressed air means to activate said means for providing compressed hot air and a fifth of said relays connected to cut-off means to activate said means for terminating the coating cycle.

2. The apparatus of claim 1, wherein the means for regulating coating formulation flow and the means for regulating dusting powder suspension flow are both spray gun means.

3. An apparatus for coating materials selected from the group consisting of tablets, capsules and particles, which comprises a baffled coating pan equipped with 3 to 4 gradually tapered baffles, equidistant from each other, sloped in the direction of the motion of said coating pan and extending so that (1) the ratio of the pan diameter to the distance from the bottom end of the baffle to the bottom center of the pan and (2) the ratio of the pan diameter to the distance from the top end of the baffle to the outer edge of the pan are each from about 4.2 to about 8.4, means for rotating said coating pan, means for spraying coating formulation, means for providing compressed hot air and means for hot air withdrawal, all of said means operating within said coating pan, means for reading and transmitting coded signals, covering a plurality of at least about ten cycles, on interchangeable tapes to a series of four independently activated relays, one of said relays being connected to a coating pan positioned on an inclined axis to activate means for initiating rotation of said coating pan, a second of said relays connected to a spray means to activate said means for regulating coating formulation flow, a third of said relays connected to compressed air means to activate said means for providing compressed hot air and a fourth of said relays connected to cut-off means to activate said means for terminating the coating cycle.

4. The apparatus of claim 3, wherein the means for regulating coating solution flow is spray gun means.

References Cited in the file of this patent

UNITED STATES PATENTS

| | | |
|---|---|---|
| 278,780 | Daniels | June 5, 1883 |
| 2,308,420 | Hoopes | Jan. 12, 1943 |
| 2,475,245 | Leaver et al. | July 5, 1949 |
| 2,625,903 | Opie | Jan. 20, 1953 |
| 2,736,288 | Clay et al. | Feb. 28, 1956 |
| 2,754,795 | Enssle | July 17, 1956 |
| 2,807,230 | Brammar | Sept. 24, 1957 |
| 2,954,323 | Endicott et al. | Sept. 27, 1960 |
| 3,003,699 | Cail et al. | Oct. 10, 1961 |
| 3,027,273 | Sacks | Mar. 27, 1962 |
| 3,041,243 | Sugimoto et al. | June 26, 1962 |